United States Patent [19]

Parulski et al.

[11] Patent Number: 5,610,654
[45] Date of Patent: Mar. 11, 1997

[54] AUTOMATIC CAMERA EXPOSURE CONTROL USING VARIABLE EXPOSURE INDEX CCD SENSOR

[75] Inventors: Kenneth A. Parulski; James E. McGarvey, both of Rochester, N.Y.

[73] Assignee: Eastman Kodak Company, Rochester, N.Y.

[21] Appl. No.: 611,839

[22] Filed: Mar. 6, 1996

Related U.S. Application Data

[63] Continuation of Ser. No. 229,939, Apr. 19, 1994, abandoned.

[51] Int. Cl.⁶ ............................. H04N 5/235; H04N 5/238
[52] U.S. Cl. ............................. 348/229; 348/366; 348/347
[58] Field of Search ............................. 348/207, 213, 348/362, 363, 364, 366, 370, 229, 347

[56] References Cited

U.S. PATENT DOCUMENTS

| | | | |
|---|---|---|---|
| 3,555,181 | 1/1971 | Thommen | 178/7.2 |
| 4,470,067 | 9/1984 | Mino | 358/174 |
| 4,673,274 | 6/1987 | Nagaoka et al. | 354/403 |
| 4,780,766 | 10/1988 | Nutting | 358/228 |
| 4,786,933 | 11/1988 | Makino | 354/408 |
| 4,805,010 | 2/1989 | Shroyer et al. | 348/366 |
| 4,879,600 | 11/1989 | Ise et al. | 348/371 |
| 4,884,144 | 11/1989 | Jinnai | 348/229 |
| 4,903,136 | 2/1990 | Iketani | 348/229 |
| 4,998,162 | 3/1991 | Kondo et al. | 358/41 |
| 5,070,408 | 12/1991 | Kikuchi et al. | 358/227 |
| 5,093,716 | 3/1992 | Kondo et al. | 358/41 |
| 5,113,245 | 5/1992 | Oda | 358/41 |
| 5,128,769 | 7/1992 | Arai et al. | 358/228 |
| 5,140,357 | 8/1992 | Suda et al. | 348/347 |
| 5,144,450 | 9/1992 | Kikuchi et al. | 348/347 |
| 5,192,998 | 3/1993 | Tokumitsu et al. | 358/41 |
| 5,194,956 | 3/1993 | Iwamoto | 358/209 |
| 5,212,598 | 5/1993 | Kikuchi | 348/347 |
| 5,258,848 | 11/1993 | Kondo et al. | 358/228 |

FOREIGN PATENT DOCUMENTS

| | | | |
|---|---|---|---|
| 0559479A2 | 3/1993 | European Pat. Off. | H04N 5/243 |
| 4107078 | 4/1992 | Japan | H04N 5/243 |
| 6070229 | 3/1994 | Japan | H04N 5/243 |
| 6098252 | 4/1994 | Japan | H04N 5/235 |
| 61145971 | 7/1996 | Japan | H04N 5/235 |

*Primary Examiner*—Leo Boudreau
*Assistant Examiner*—Bipin Shalwala
*Attorney, Agent, or Firm*—David M. Woods; Marc Rossi; Francis H. Boos, Jr.

[57] ABSTRACT

An improved automatic exposure control system for an electronic still camera which uses a variable amplifier to amplify the output signal of an image sensor. A low electrical gain is used when the scene is bright enough to provide a sufficiently fast shutter speed and depth of field in order to keep from blurring the image to be captured. The gain is increased as the scene illumination decreases. Some amount of increased gain is preferably used even before the aperture of the camera is fully opened. The gain of the variable gain amplifier is adjusted as the user changes the focal length (zoom) setting, as the required shutter speed and f-number needed to provide a blur-free image depends on the lens focal length. The gain may also be adjusted as a function of focus distance setting.

7 Claims, 1 Drawing Sheet

AUTOMATIC CAMERA EXPOSURE CONTROL USING VARIABLE EXPOSURE INDEX CCD SENSOR

This is a continuation of application Ser. No. 08/229,939, filed Apr. 19, 1994 now abandoned.

FIELD OF THE INVENTION

The invention relates generally to automatic exposure control systems and, more specifically, to automatic exposure control systems for electronic still image cameras.

BACKGROUND OF THE INVENTION

Image blur due to camera shake or fast moving objects is a common problem associated with recording images of scenes with a still image camera. It is generally desirable to shorten the exposure time by increasing the shutter speed of the camera to avoid image blur. Shortening the exposure time, however, lessens the amount of incident light that reaches the imaging plane of the camera. It is therefore necessary to open the aperture setting of the camera to maintain the same exposure value at the image plane. Opening the aperture setting, however, reduces depth of field thereby making it difficult to distinctly capture images over a broad distance range. Adjustments in shutter speed and aperture setting are therefore interactive, which makes it difficult to obtain quality images under certain scene conditions, as optimum exposure values must sometimes be sacrificed to provide sufficient depth of field or optimum depth of field must be sacrificed to provide a better exposure value. The difficulty of reaching an acceptable compromise between shutter speed and aperture setting is particularly compounded when long focal length "zoom" lens are employed, as the depth of field at a given aperture opening and subject distance is decreased, for long focal lengths, as compared to shorter focal lengths.

In film cameras, the tradeoff between shutter speed and aperture setting can be addressed by using a film having a different ISO rating. Electronic imaging cameras, however, generally employ an image sensor having a fixed "speed" or exposure response. It is therefore an object of the invention to provide an automatic exposure system for an electronic still camera that automatically provides the best possible still image for any given scene illumination level and lens focal length setting.

SUMMARY OF THE INVENTION

The invention provides an improved automatic exposure control system for an electronic still camera which uses a variable amplifier to amplify the output signal of an image sensor. A low electrical gain is used when the scene is bright enough to provide a sufficiently fast shutter speed and depth of field in order to keep from blurring the image to be captured. The gain is increased as the scene illumination decreases. Some amount of increased gain is preferably used even before the aperture of the camera is fully opened. The gain of the variable gain amplifier is adjusted as the user changes the focal length (zoom) setting, as the required shutter speed and f-number needed to provide a blur-free image depends on the camera magnification, which varies with lens focal length.

BRIEF DESCRIPTION OF THE DRAWINGS

The invention will be discussed in greater detail with reference to the accompanying drawing, which is a schematic block diagram of an electronic still camera in accordance with the invention.

DETAILED DESCRIPTION OF PREFERRED EMBODIMENTS

Figure 1:
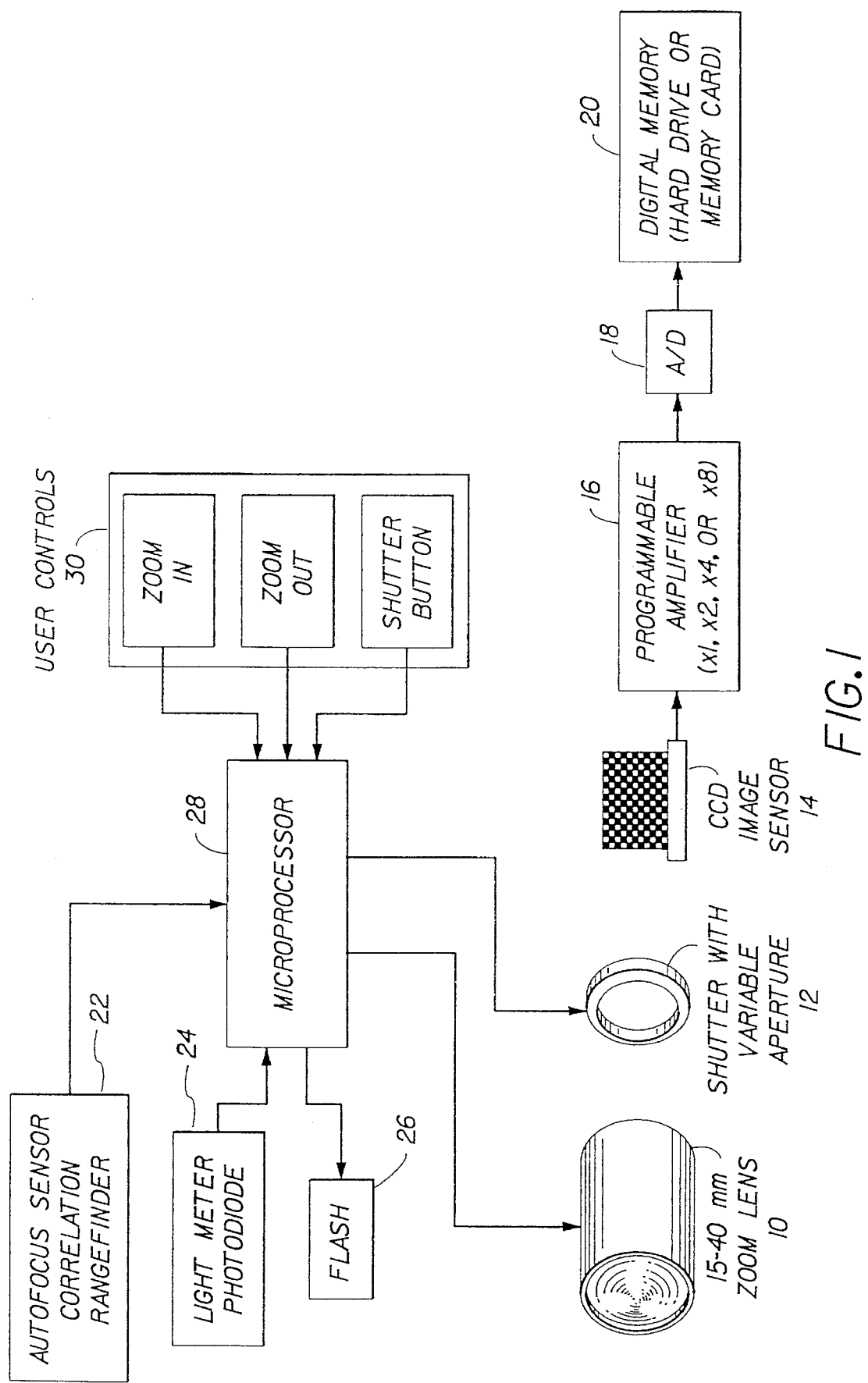

FIG. 1 is a schematic block diagram of an electronic still camera in accordance with the invention. The camera preferably includes a 15–40 mm zoom lens 10 with f/4 to f/11 aperture settings, and a shutter with a variable aperture 12 and a maximum speed of 1/200 sec, which are controlled by a microprocessor 28 in response to control signals received from user controls 30 to provide a controlled exposure of the CCD image sensor 14. The image sensor 14 is preferably a KAF-1600L image sensor (available from Eastman Kodak Company of Rochester, N.Y.) having a two-dimensional array of nine micron square photosensitive elements, comprised of 1024 lines and 1536 pixels, with an active image area of 9.2 mm×13.8 mm. The output of the image sensor 14 is amplified by a programmable amplifier 16, which is also controlled by the microprocessor 28. The programmable amplifier 16 is preferably adjustable to relative gains of 1, 2, 4 and 8, corresponding to ISO speed settings of 50, 100, 200 and 400 respectively, for the KAF-1600L image sensor. The output of the programmable amplifier 16 is provided to an analog-to-digital (A/D) converter 18 which digitizes the signal for subsequent storage in a digital memory 20 such as a Flash EPROM memory card. The image from the memory card can then be downloaded to a computer or printing device as desired. The camera is also provided with an autofocus sensor correlation rangefinder 22, a light meter photodiode 24 and a flash unit 26, which are coupled to the microprocessor 28.

In operation, the microprocessor 28 controls the lens focal length based on signals received from zoom in and zoom out switches provided in the user controls 30, which the user operates to set the desired image magnification prior to taking a picture, and controls the lens focus based on the signals received from the autofocus sensor correlation rangefinder 22. For example, when the user presses a shutter button provided in the user controls 30, the microprocessor 28 takes a light meter reading using the photodiode 24, and adjusts the lens focus using the signal derived from the autofocus sensor correlation rangefinder 22. The microprocessor 28 then sets the gain of the programmable amplifier 16, lens f-number, and shutter time, based on the light level reading and the lens focal length setting using a look-up table stored in the internal memory of the microprocessor 28 (alternatively the microprocessor can calculate the correct settings based on stored algorithms).

An example of preferred look-up tables for the wide angle (15 mm) and telephoto (40 mm) focal length settings are illustrated by Tables 1 and 2 below:

TABLE 1

| SCENE | Meter Reading Luminance (ftL) | Relative Luminance | Focal Length = 15 mm | | Exposure time (sec) |
| --- | --- | --- | --- | --- | --- |
| | | | ISO speed | Lens f/# | |
| Sun on Snow | 2000 | 1 | 50 | 11 | 0.005 |
| Summer sun | 1000 | 1/2 | 50 | 8 | 0.005 |
| Weak hazy sun | 500 | 1/4 | 50 | 8 | 0.01 |
| Cloudy bright | 250 | 1/8 | 50 | 5.6 | 0.01 |
| Open shade | 125 | 1/16 | 100 | 5.6 | 0.01 |
| | 63 | 1/32 | 100 | 4 | 0.01 |
| | 31 | 1/64 | 100 | 4 | 0.02 |
| | 16 | 1/128 | 200 | 4 | 0.02 |
| Office | 8 | 1/256 | 400 | 4 | 0.02 |
| | 4 | 1/512 | 400 | 4 | 0.041 |
| Kitchen | 2 | 1/1024 | 400 | 4 | 0.082 |

TABLE 2

| SCENE | Meter Reading Luminance (ftL) | Relative Luminance | Focal Length = 40 mm ISO speed | f/# | Exposure time |
|---|---|---|---|---|---|
| Sun on Snow | 2000 | 1 | 50 | 11 | 0.005 |
| Summer sun | 1000 | 1/2 | 50 | 8 | 0.005 |
| Weak hazy sun | 500 | 1/4 | 100 | 8 | 0.005 |
| Cloudy bright | 250 | 1/8 | 100 | 5.6 | 0.005 |
| Open shade | 125 | 1/16 | 100 | 5.6 | 0.01 |
|  | 63 | 1/32 | 200 | 5.6 | 0.01 |
|  | 31 | 1/64 | 200 | 4 | 0.01 |
|  | 16 | 1/128 | 400 | 4 | 0.01 |
| Office | 8 | 1/256 | 400 | 4 | 0.02 |
|  | 4 | 1/512 | 400 | 4 | 0.041 |
| Kitchen | 2 | 1/1024 | 400 | 4 | 0.082 |

Other look-up tables are stored for intermediate focal length settings, for example 20 mm, 25 mm, 30 mm and 35 mm. The table closest to the focal length selected by the user (using the zoom in/out controls 30) is used.

As shown in the illustrated tables, the gain of the programmable amplifier is set based on the lens focal length. For example, if the light reading is 250 foot Lamberts (ftL), as would typically be the case on a cloudy day, and the lens position is 15 mm (wide angle), the microprocessor 28 selects a gain of 1 (ISO=50), an f-number of 5.6 and a shutter time of about 1/100 second. The indicated selections provide the lowest noise image possible, since the minimum gain is used, while having a shutter time sufficient to prevent blur due to camera shake and an f-number providing a sufficient depth of field. If the lens position is instead 40 mm for the same 250 ftL light reading, however, the microprocessor 28 selects a gain of 2 (ISO=100), with an f-number of 5.6 and a shutter time of 1/200 second. The longer shutter time is used in order to minimize blur due to camera shake, which is a more important factor with long focal length lenses than with short focal length lenses due to the greater magnification. The ISO 100 image will have slightly more noise than if ISO 50 were used, but it will also have significantly less blur. The overall image quality will therefore be higher.

Comparing Tables 1 and 2, it will be noted that the aperture settings for the same illumination level may have different values for the 15 mm and 40 mm focal length settings. For example, for the 63 ftL setting, an f/#=4.0 setting is used when the focal length is set by the user to 15 mm, while an f/#=5.6 setting is used when the user sets the focal length to 40 mm. The larger f/# setting (smaller aperture) is used at the 40 mm setting in order to obtain an adequate depth of field. If a smaller f/# was used, the image would be more likely to appear blurred because objects in front of or behind objects located at the focus distance would be slightly out of focus. At the 15 mm setting, the f/4 setting does provide sufficient depth of field, however, since the depth of field is inversely related to the lens focal length.

The invention automatically optimizes the tradeoff between image blur and noise. At high illumination levels, there is low noise and little blur, while at lower illumination levels both the noise and blur increase slightly. The optimization provides improved image quality relative to an image with lower noise but substantially more blur.

In the example illustrated above, Tables 1 and 2 are used for all focus distance settings of the lens. It will be understood that different tables (or alternately, different algorithms) may be used for different focus distance settings. Table 3 shows a preferred look-up table for the 40 mm focal length setting, in a second embodiment of the invention, when the lens focus is set for a focus distance of greater than 15 feet. Table 2 is used for the 40 mm setting when the focus setting is less than 15 feet. Alternate embodiments could use more look-up tables optimized for intermediate focus distance settings.

TABLE 3

| SCENE | Meter Reading Luminance (ftL) | Relative Luminance | Focal Length = 40 mm ISO speed | f/# | Exposure time |
|---|---|---|---|---|---|
| Sun on Snow | 2000 | 1 | 50 | 11 | 0.005 |
| Summer sun | 1000 | 1/2 | 50 | 8 | 0.005 |
| Weak hazy sun | 500 | 1/4 | 50 | 5.6 | 0.005 |
| Cloudy bright | 250 | 1/8 | 50 | 4.0 | 0.005 |
| Open shade | 125 | 1/16 | 100 | 4.0 | 0.005 |
|  | 63 | 1/32 | 100 | 4.0 | 0.01 |
|  | 31 | 1/64 | 200 | 4.0 | 0.01 |
|  | 16 | 1/128 | 400 | 4.0 | 0.01 |
| Office | 8 | 1/256 | 400 | 4.0 | 0.02 |
|  | 4 | 1/512 | 400 | 4.0 | 0.041 |
| Kitchen | 2 | 1/1024 | 400 | 4.0 | 0.082 |

Focal Length = 40 mm
Focus = >15 ft

The focus setting is determined by the autofocus sensor 22. The microprocessor 28 selects the proper table (or algorithm parameters) based on the focus distance and the lens focal length setting. If the focal length setting is 40 mm and the focus distance is >15 feet, Table 3 is used, while Table 2 is used if the focal length setting is 40 mm and the focus distance is <15 feet. Note that for the same scene luminance and lens focal length, Tables 2 and 3 show that different apertures and ISO speed amplification factors may be used, depending on the focus distance. This is done because the depth of focus increases as the focus distance increases. Therefore, a smaller f/# and lower ISO speed setting may be used. For example, for "cloudy bright" scenes (250 ftL light meter readings) the f/# equals 5.6 and ISO speed equals 100 when the focus distance is less than 15 feet (table 2), while the f/# equals 4.0 and the ISO speed equals 50 when the focus distance is greater than 50 feet.

The invention has been described with reference to certain preferred embodiments thereof. It will be understood, however, that modifications and variations are possible within the scope of the appended claims. For example, the programmable amplifier can either be an analog programmable gain stage or a digital device such as a digital multiplexer, a digital multiplier or a digital look-up table. The digital gain is preferably applied before the image is stored, though it could be applied after the image is stored, for example as the image is downloaded to the computer or printer. The invention is also applicable to systems that employ a fixed shutter with a variable aperture or a variable shutter with a fixed aperture, as well as systems that utilize both a variable shutter and variable aperture. The invention could be used with a lens having manually adjusted focusing or a single fixed focus setting.

INDUSTRIAL UTILITY

The invention provides an automatic exposure control system for use in electronic still image cameras. The automatic exposure control system optimizes the tradeoff between image blur and noise by adjusting the gain of a programmable amplifier and the lens aperture in accordance with lens focal length setting.

What is claimed is:

1. An electronic camera comprising:

a variable focal length lens that is adjustable to a preferred focal length for imaging scene light onto an electronic image sensor;

a programmable amplifier coupled to an output of the electronic image sensor;

a light sensing means for generating a scene light level signal;

a variable aperture; and control means for setting the gain of the programmable amplifier for each exposure operation based on both the preferred focal length and the scene light level signal and for setting the variable aperture for each exposure operation based on both the preferred focal length and the scene light level signal.

2. An electronic camera as claimed in claim 1, wherein the camera further includes a focus sensor coupled to the control means, and wherein the control means further sets the gain of the programmable amplifier in response to signals received therefrom.

3. An electronic camera as claimed in claim 1, wherein the control means sets the gain of the programmable amplifier to a value greater than one when the variable aperture is set at less than a fully open position.

4. An electronic camera as claimed in claim 1, wherein the programmable amplifier is an analog programmable gain stage.

5. An electronic camera as claimed in claim 4, further comprising an analog-to-digital converter coupled to the output of the analog programmable gain stage.

6. An electronic camera as claimed in claim 1, wherein the programmable amplifier is at least one of a digital multiplexer, a digital multiplier, and a digital look-up table.

7. An electronic camera as claimed in claim 1, wherein the programmable amplifier gain is also set based on a focus distance setting of the lens.

* * * * *